United States Patent [19]

Tower

[11] Patent Number: 5,946,278
[45] Date of Patent: Aug. 31, 1999

[54] STORAGE AND SELECTION SYSTEM FOR AUDIO, VISUAL, AND INFORMATION STORAGE MEDIA

[76] Inventor: Robert P. Tower, 281 Lake Dr., Coconut Creek, Fla. 33066

[21] Appl. No.: 08/925,503

[22] Filed: Sep. 8, 1997

Related U.S. Application Data

[60] Provisional application No. 60/025,675, Sep. 9, 1996, abandoned.

[51] Int. Cl.[6] .................................................. G11B 17/22
[52] U.S. Cl. ............................................................ 369/36
[58] Field of Search ........................ 340/825.15, 825.17, 340/825.35, 825.36, 825.49, 825.72, 825.82; 360/132, 137; 369/30, 32, 33, 34, 35, 36, 77.1, 77.2, 177, 178, 292; 395/600

[56] References Cited

U.S. PATENT DOCUMENTS

| | | | |
|---|---|---|---|
| 4,580,685 | 4/1986 | Jorquez | 211/56 |
| 4,766,581 | 8/1988 | Kors et al. | 369/30 |
| 5,038,023 | 8/1991 | Saliga | 235/385 |
| 5,303,214 | 4/1994 | Kulakowski et al. | 369/34 |
| 5,388,260 | 2/1995 | Monahan et al. | 395/600 |
| 5,465,085 | 11/1995 | Caldwell et al. | 340/825.35 |
| 5,475,835 | 12/1995 | Hickey | 395/600 |
| 5,548,567 | 8/1996 | Sawai | 369/36 |
| 5,689,484 | 11/1997 | Hirasawa | 369/33 |
| 5,751,672 | 5/1998 | Yankowski | 369/30 |

*Primary Examiner*—David L. Ometz
*Assistant Examiner*—Angel Castro
*Attorney, Agent, or Firm*—Malin, Haley DiMaggio & Crosby. PA

[57] ABSTRACT

A computerized storage and selection system is provided that conveniently stores, selects, and identifies the storage location for retrieval by the user of a large number of audio, visual, and information storage media devices such as discs, compact discs, tapes, cassettes, CD-ROMs, and the like. The system selects the storage location based upon user input, including partial or fragmentary input. A system computer optically senses and stores the content and selected storage location of each media device. The system responds to user requests for specific media by recalling the storage location of the disc and identifying the location for quick retrieval by the user.

3 Claims, 11 Drawing Sheets

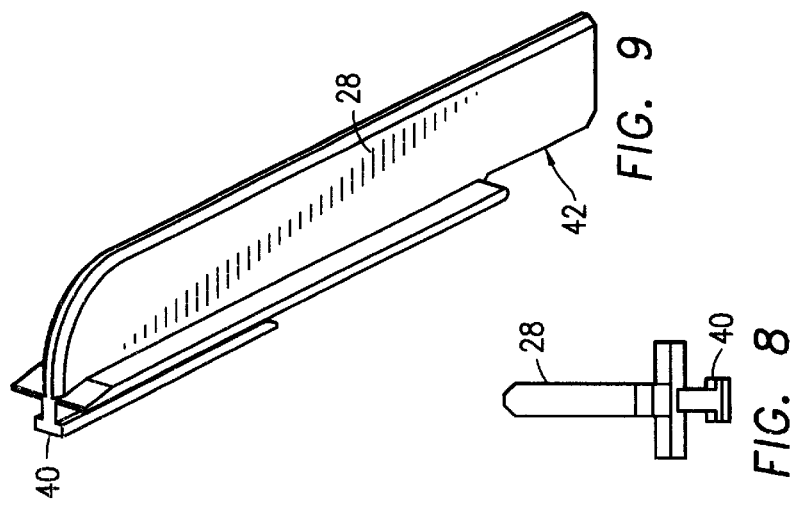
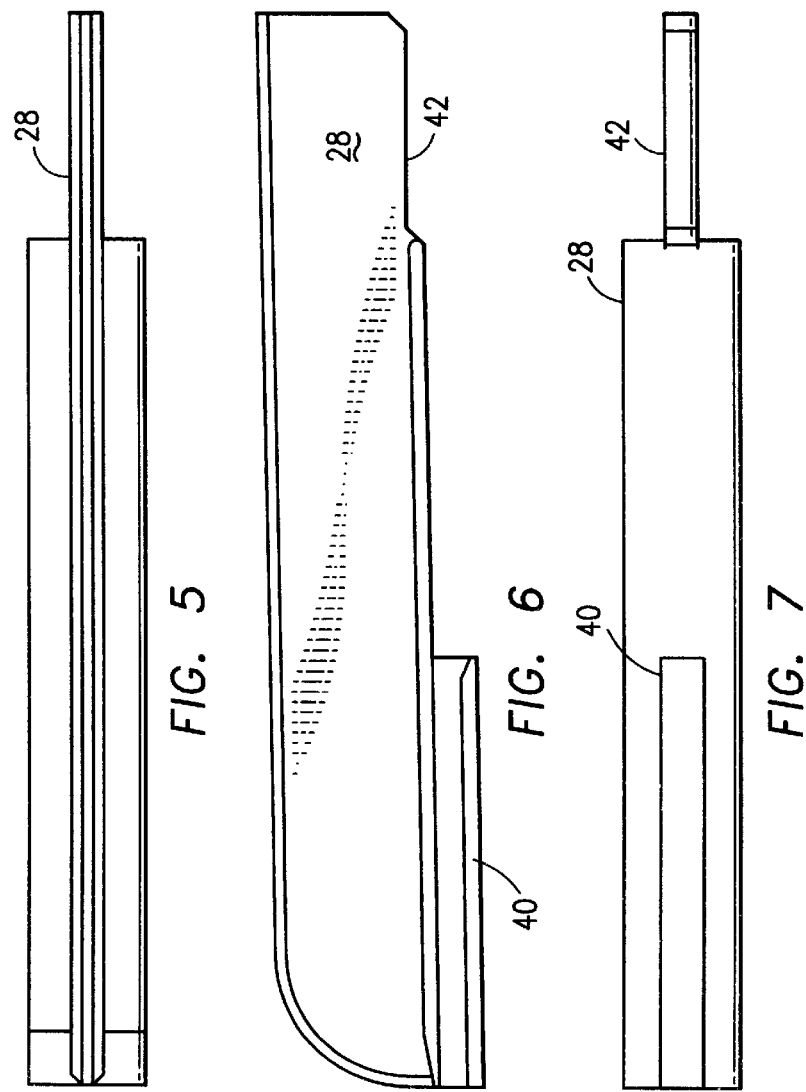

STORAGE AND SELECTION SYSTEM FOR AUDIO, VISUAL, AND INFORMATION STORAGE MEDIA

This application claims the benefit of U.S. Provisional Application No. 60/025,675, filed Sep. 9, 1996.

BACKGROUND OF THE INVENTION

1. Field of the Invention

This invention relates to a storage, selection, and location system for audio, visual, or information storage media, and more particularly, to a computerized system that conveniently stores a large number of audio, visual, or data storage devices, such as video and/or audio discs, compact discs, tapes, cassettes, CD-ROMs, and the like, selects specific storage devices based on user input, and identifies the device's storage location for retrieval by the user.

2. Description of Related Art

"Jukeboxes" or record changers for vinyl records and the like are well known in the art. There currently exist compact disc (CD) jukeboxes which can hold up to 100 discs and may be expandable to perhaps 500 discs. The current CD systems are fully automated which includes a CD player and the mechanics to move the CDs to and from the player. The current systems require considerable maintenance, and are expensive. The current systems store the naked disc, not the jewel box or liner notes. However, similar systems for other types of storage media such as large discs, tapes, cassettes, semiconductor memory, and the like, are not known in the art. As used herein, "media" refers to any of the plurality of devices utilized to store audio, visual, or other information, in analog or digital electronic form.

There also exist manual storage containers that essentially consist of a shelf or drawer with dividers or slots that fit, for example, a number of compact disc jewel boxes or other media. Manual storage systems store media in random fashion in the storage slots. To quickly locate and retrieve a specific medium after storage, manual systems require the user to devise a scheme, such as alphabetizing the media by artist or title prior to storage. Problems arise when a new medium is added to a collection as the alphabetized media must be reorganized to accommodate the newly added medium.

With large collections, a user must search through the alphabetized media to locate a specific title or artist. Furthermore, the user cannot locate a specific media knowing only fragmentary information about the media desired. For example, if the user wants a specific song, the user must recall which medium contains the song desired. If the media are stored alphabetically according to artist, and the user remembers the song but not the artist, the user cannot find that song.

There exists a need for a reliable compact disc or other media storage, selection, and retrieval system for users having large collections of media, that can quickly and easily store the media, such as the CD and jewel boxes, and that allows for easy access, and removal of the media so they may be used in high quality home players, business players, car players, and other remote locations.

A system is especially needed for bulk users, such as radio stations, and retail businesses, that not only must store large numbers of media such as discs, but must be able to quickly locate, access, and retrieve the stored media. The system should be able to locate a medium if the user has only fragmentary or partial information about a song, artist, or other stored information.

SUMMARY OF THE INVENTION

The present invention is an audio, visual, and information storage system used to select and locate a specific storage medium such as a disc, compact disc (CD), computer CD-ROM, or any audio, video, or other data storage device, hereinafter referred to as "media".

In one embodiment for storage of CDs, the system can be composed of a variable number of storage modules which each hold any number of CDs, such as 32, 64, or 128, in individual storage cells, and a controller which contains the common control electronics and the user software interface. The controller can include a display device such as an alphanumeric display, an input device, and a sensor such as a bar code reader capable of reading the bar code information which is present on most CD jewel boxes or other media cases, or an optical scanner capable of reading the information off the CD jewel box or other medium box. The storage modules will include a position sensor for each storage location or cell for each medium, plus position indicators, such as LEDs capable of indicating a specific storage cell.

The controller assists the user in selecting the medium based on a combination of numerous fields such as title or title segment, music type, artist, artist sex, previous play history, or information about the data that is contained on the media, and the like. Once the medium is selected, lights imbedded in the storage modules can pinpoint the medium's storage location. To store the medium, such as a CD, the user moves the CD jewel box past a sensor such as a bar code reader and then places the CD in any empty location. The controller can use a bar code-based, or other database and input from the position sensors to determine and store the title and location of the CD, or other media. Alternately, the controller can use an optical scanner and optical character recognition (OCR) software along with the position sensor information to determine the title and location of the CD, or other media.

The media does not have to be returned to the same location and it is not necessary that the media be kept in alphabetical order or any other type of order. Additionally, if one picks a medium, uses it, and then stores it without removing any other media in between, the bar code reader or other sensor does not have to be used since the program will know which medium is being stored.

One embodiment of the controller can be a personal computer (PC) with a bar code reader interface and a multiple point serial interface (such as RS485) to the storage modules. Alternately, the PC may be replaced by a dedicated processor, with a display, such as an LCD output display, and input device such as a touchscreen. There can be a common power supply for the storage modules. Thus, the storage modules will be connected to the controller via a "daisy chained" serial communications cable, and a daisy chained power cable.

The ease of selecting and locating media makes it practical to use separate drawers for medium storage rather than alternate shelf-based systems. A drawer based storage system is more space efficient than a shelf-based system which is usually only one CD, or other medium deep. A shelf-based system can be easier to visually scan when selecting and locating the media since the user does not have to open and close the various drawers.

When the number of media grows large, it can be time consuming to manually select and locate a medium in both shelf and drawer based systems, and the storage area required can be large. The system can store media in the most space efficient manner and allows the user to select and locate media in a time efficient manner. The media utilized can be a combination of the various media available for storage of information so that, for example, music CDs, cassettes, VHS video tape, CD-ROMs, and other storage media can all be stored in one system.

The system can be utilized in a library or retail environment. When a user pulls a storage device, a video screen can display information about the medium pulled. The user can input information about a desired topic, and the system can direct the user to the appropriate storage locations for the desired topic and related topics.

One embodiment of the present invention can include a personal computer (PC) running user interface software connected to a variable number of storage modules. Each storage module can be configured as a storage drawer containing a custom printed circuit board (PCB) with a microcontroller running a custom software module. A control module or controller can be configured containing the PC, or alternately, a dedicated control microprocessor, and can be included in a drawer with one or more storage modules. The storage module PCB can be configured for nearly any size storage module for storing any number of media.

The user interface can contain a database which includes information about the media to be stored. The database can be purchased or assembled by the user. For example, in the case of music compact discs (CDs), the database may be purchased from the same source that supplies the database for POS terminals used in CD stores. The database can be expanded by the user and the software to include user preferences, usage statistics, and other information as desired by the user.

Accordingly, it is an object of the present invention to provide a storage, selection, and retrieval system for electronic information storage media that operates quickly and easily.

It is a further object of the present invention to provide a media storage, selection, and retrieval system that can be utilized with a plurality of different audio, visual, and data storage media.

It is another object of the present invention to provide an electronic storage media storage, selection, and retrieval system that can locate a stored medium with only fragmentary information about what is stored on the medium.

It is still another object of the present invention to provide an electronic storage media storage, selection, and retrieval system that can randomly store and retrieve a stored medium by quickly scanning or inputting pertinent information about the medium's content.

In accordance with these and other objects which will become apparent hereinafter, the instant invention will now be described with particular reference to the accompanying drawings.

BRIEF DESCRIPTION OF THE DRAWINGS

FIG. 5 is a top plan view of a separator for the storage module of FIG. 3.

FIG. 6 is a front elevational view of that of FIG. 5.

FIG. 7 is a bottom plan view of that of FIG. 5.

FIG. 8 is an end elevational view of that of FIG. 5.

FIG. 9 is a perspective view of that of FIG. 5.

DESCRIPTION OF THE PREFERRED EMBODIMENTS

Figure 1:
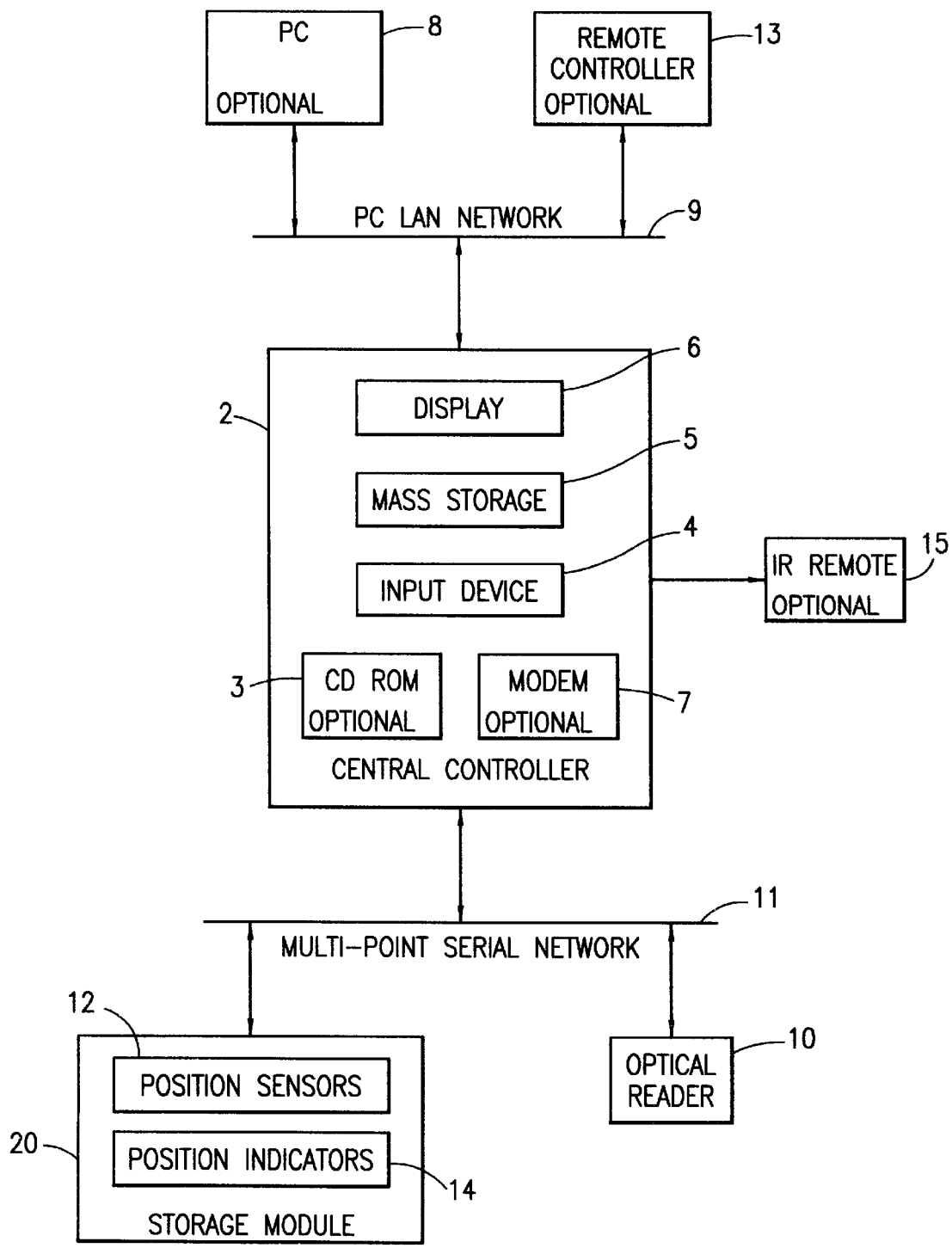
FIG. 1 is a block diagram of the present invention.

A block diagram of the hardware for one embodiment of the present invention is illustrated in FIG. 1. The central controller 2, runs the user interface program and controls the rest of the system. Display 6 can be any suitable display such as an LCD display or a CRT display. The input device 4 may be any suitable input device such as one of, or a combination of, a keyboard, a pen, a mouse, or a touch-screen. The mass storage device 5 may be a hard disk, flash memory or any form of non-volatile memory. Mass storage device 5 can be used to store the user interface software program and the database of stored media items. The optional CD-ROM drive 3 can hold a video, audio, or other information guide, such as a "Cinemania" CD-ROM, to provide further information to the user about potential titles to play or media to retrieve. In addition, the CD-ROM drive 3 can be used to read track information, such as the number and duration of the tracks on a CD. The optional modem 7 can be used for software upgrades and for downloading information about stored items from a remote database.

The central controller 2 may be a customized computer component, or it may be a personal computer (PC), laptop, notebook, tablet or other off-the-shelf computer. Controller 2 can be interconnected to a local area network (LAN) 9 and a multiple point serial interface 11. Controller 2 may be wireless, in which case, an additional module would be required to connect it to the two networks.

Storage module 20, as fully described herein below, contains position sensors 12 which tell the central controller 2 when a storage media item has been inserted or removed from a storage slot. Storage module 20 also contains position indicators 14, which the central controller 2 uses to guide the user to a selected storage item location. Multiple storage modules 20 can be "daisy chained" together, along with the central controller 2 in a multiple point serial network 11, such as an RS485 network.

The optical reader 10 can be any suitable sensor, such as a bar code reader, and is used to identity a storage media item before it is inserted into a storage slot. There can be more than one optical readers 10 for large systems where it might be not be convenient to have one optical reader in a central location. In addition, two or more types of readers can be utilized in one system. For example, a bar code reader, for easy identification of storage items, and an optical scanner for inputting other information, including graphics, can be utilized to scan information into the database for specific storage media items.

The personal computer 8, which is optional, can be connected to the central controller 2 via local area network (LAN) 9. Computer 8 can be used for development, remote access to the system database, downloading of software or database updates, and backups or restores of the system database.

The remote controller 13, is an optional component of the system which can be used for large systems so that a user interface is within convenient distance from any storage module 20. Remote controller 13 allows the user to have the same access to the system as is possible from the central controller 2. Remote controller 13 can be useful for applications such as in a retail environment, where it is desired to have multiple users capable of accessing the system concurrently. The remote controller 13 may be wireless.

For example, a plurality of users upon entering a retail environment could each be given a remote controller 13, that could be a wireless computer tablet. The remote controller 13, or computer tablet, could display a store map and direct the user first to a specific store area, then to a specific cabinet 22, to a specific drawer 24, and to a specific storage module 20 and a specific storage location 29. The user can be directed in response to a request, or to a series of requests, each time narrowing the search to more specific media.

The infra-red (IR) remote 15, is an optional component of the system which can be used to program external devices such as a user's CD player, or other media player, or portion of a component such as volume control or receiver input source selection. For example, the user interface software can allow the user to create a play list of songs on multiple CDs and can guide the user in the playing of these songs. With the IR remote 15 installed, the system can instruct the user to insert CDs in a multiple disc CD player and then the system can program the player to play the songs from the play list. The play list could be of indefinite length. The system could guide the user in playing this list by prompting the user to change discs and have the system do the rest.

Figure 2:
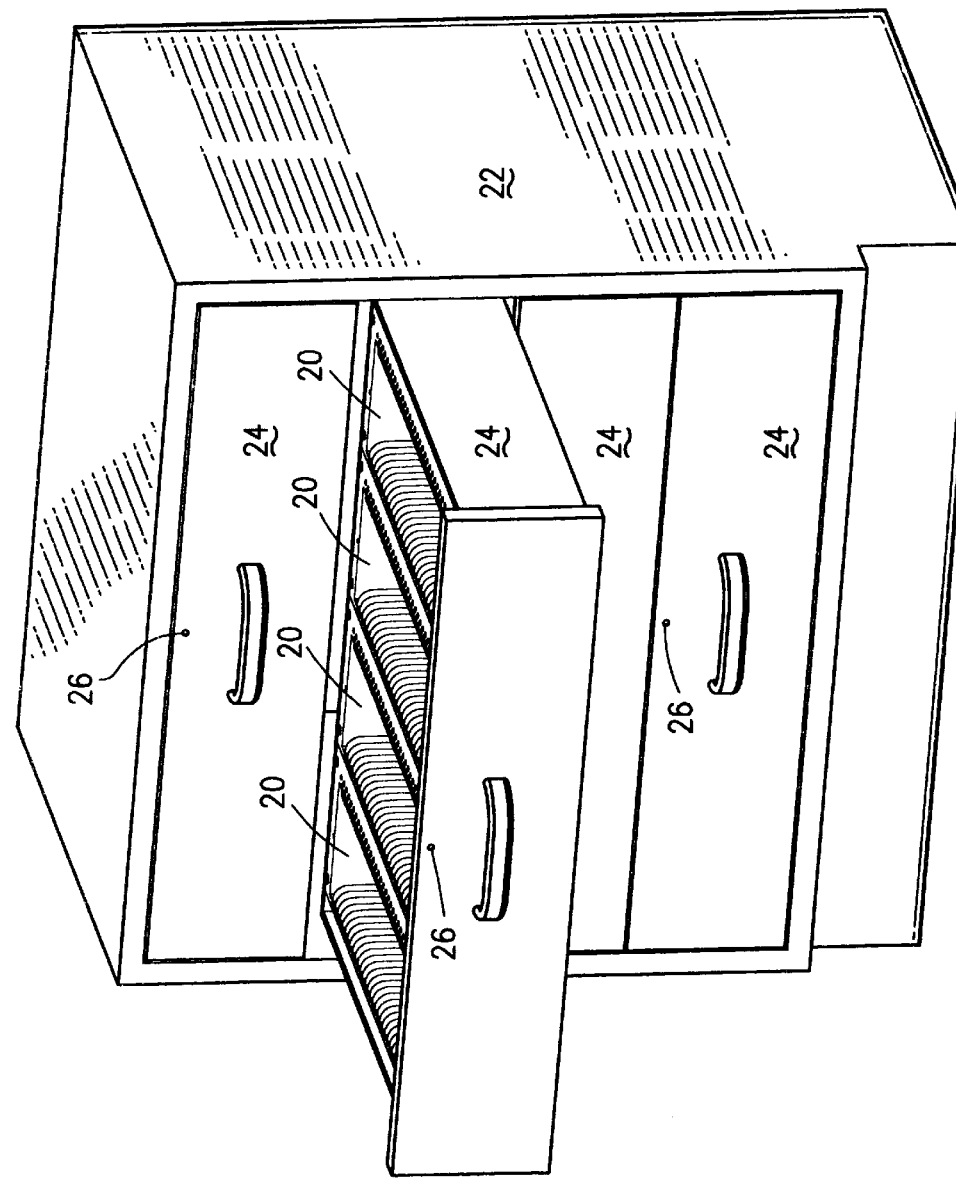
FIG. 2 is a perspective view of one embodiment of the present invention.

Referring to FIG. 2, the present invention will be described utilizing one embodiment for selection, storage, and retrieval of CDs in a four drawer cabinet or chest as an example. It should be understood that the specific media stored can be other than CDs, and can include any audio, visual, or informational storage media alone, or in combination, such as discs, tapes, cassettes, CD-ROMS, semiconductor memory, and the like. In addition, the four drawer cabinet can include any number of drawers, or can be configured as a bookshelf instead of a cabinet.

In this embodiment, cabinet 22 includes four identical drawers 24. Each drawer 24 includes an external indicator 26, such as an LED, to indicate a particular drawer to the user. The central controller 2, which as described herein above can be a PC, laptop, or notebook computer, and optical reader 10 can be placed on top of cabinet 22, or placed within one of the drawers. Each drawer 24 can contain a plurality of storage modules 20. In the illustrated example, each drawer 24 includes four (4) storage modules 20.

Figure 3:
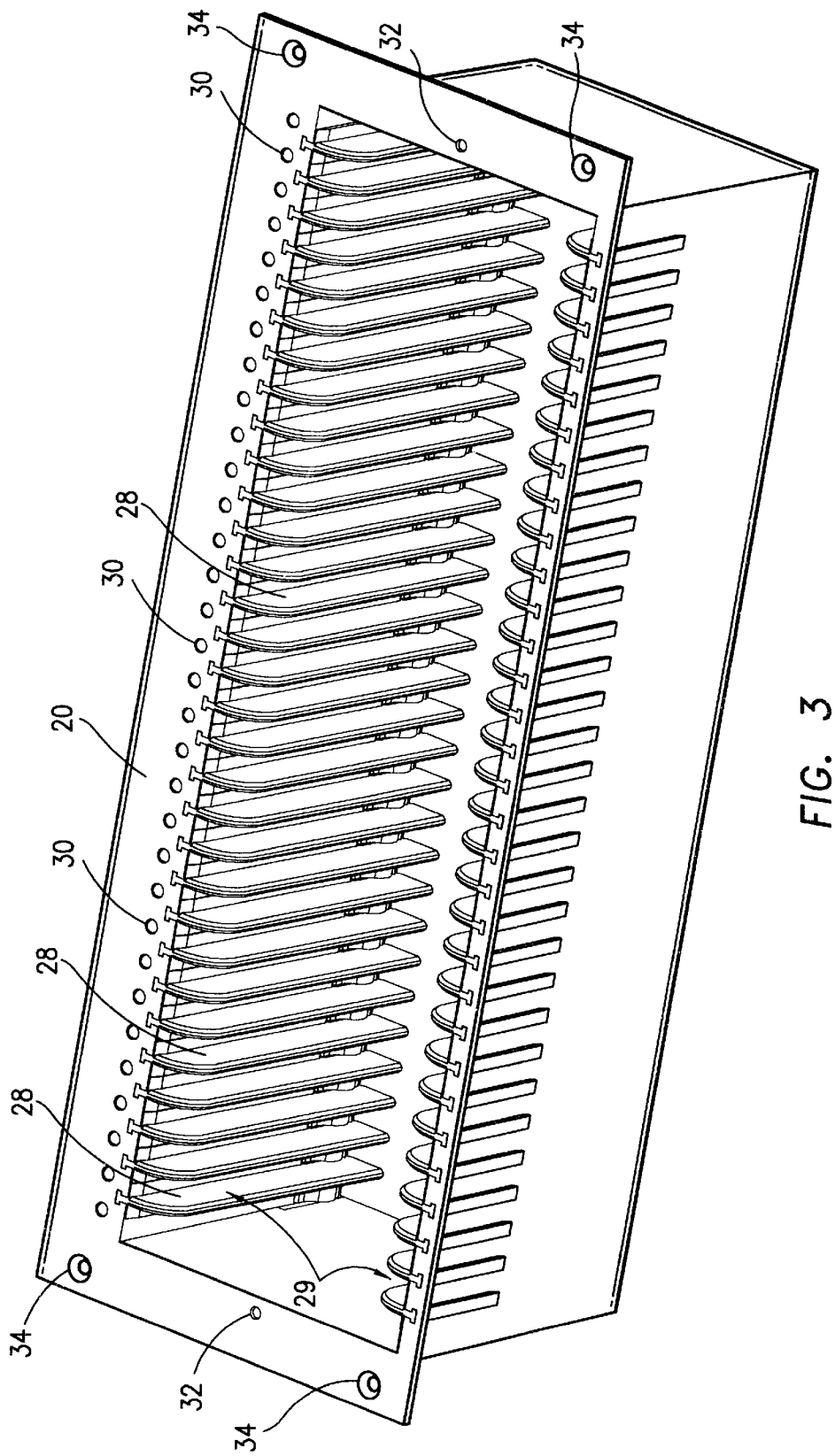
FIG. 3 is a perspective view of a storage module for the embodiment of FIG. 2.

Referring to FIG. 3, storage module 20 includes a plurality of separators or dividers 28. Separators 28 form a plurality of slots 29 for receiving the media, and which are sized for CDs in the present example. Storage module 20 includes a plurality of apertures 30, one of which is positioned adjacent to each slot 29, for receiving a position indicator 14, such as an LED. In addition, apertures 32 can be utilized to receive an indicator to indicate a specific storage module 20 to the user.

Storage module 20 can be attached to drawer 24 in any suitable manner. For example, apertures 34 can be utilized to receive screws or other type fasteners that can be attached to drawer 24.

In the present example, storage module 20 can include thirty-two (32) slots 29. Each drawer 24 can include four (4) storage modules 20, for a total of 128 storage slots 29. Each cabinet 22 can include four (4) drawers for a total storage capacity of 512 CDs. Interconnecting multiple cabinets 22 via serial network 11 can result in up to twenty-five (25) cabinets 22, and storage capacity of 12,800 CDs for a conventional serial network 11 having a capacity of 128 loads using 5 per cabinet. The storage capacities given for the present example can be reduced or increased for alternate embodiments of the present invention. For example, the capacity can be increased to 1,638,400 discs by addition of a simple PCB.

Figure 4:
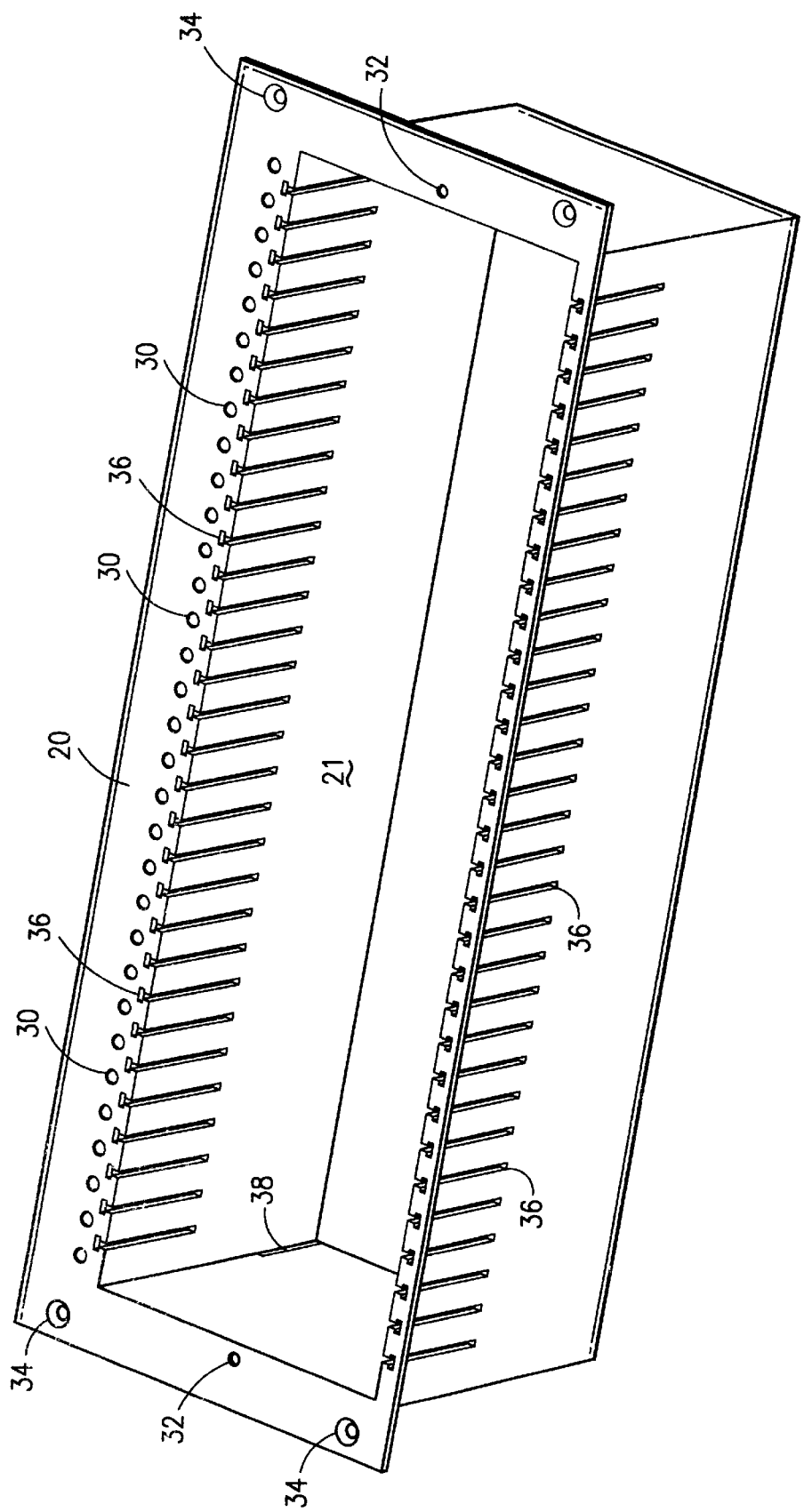
FIG. 4 is a perspective view of a framework for the storage module of FIG. 3.

Referring to FIG. 4, framework 21 for storage module 20 is illustrated having slots 36 for insertion of separators 28, and slot 38 for insertion of a plurality of position sensors 12, as fully described herein below. As illustrated, framework 21 is suitable for injection molding, cast molding, or thermoformed manufacturing methods.

Referring to FIGS. 5–9, one embodiment of separator 28 can include raised member 40 for insertion into slot 36 on storage module 20, and recessed area 42 can be spaced to receive position sensors 12.

Figure 10:
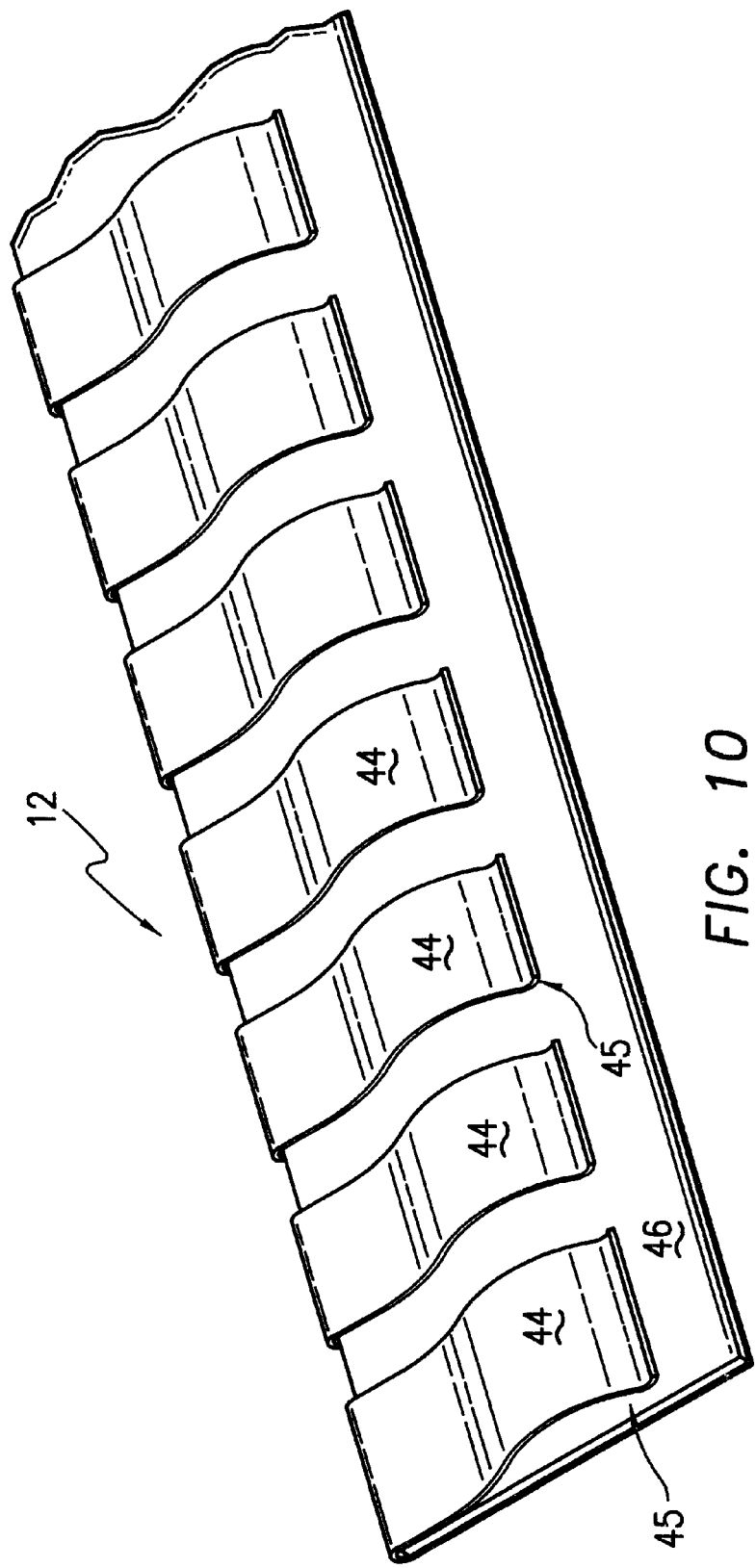
FIG. 10 is a perspective view of the position sensors of the embodiment of FIG. 3.

Referring to FIG. 10, position sensors 12 can include a plurality of switch actuators 44 which activate an underlying series of switches 45 mounted on rigid member 46. Rigid member 46 can be made of any suitable material such as metal. Switches 45 which are activated by actuators 44 can be an array of membrane switches secured to rigid member 46 by a suitable manner such as adhesive. Alternately, switches 45 can be discrete switches such as conventional microswitches, or can replaced by optical sensors, and the like, to permit controller 2 to sense removal and installation of the media in slots 29.

Figure 11:
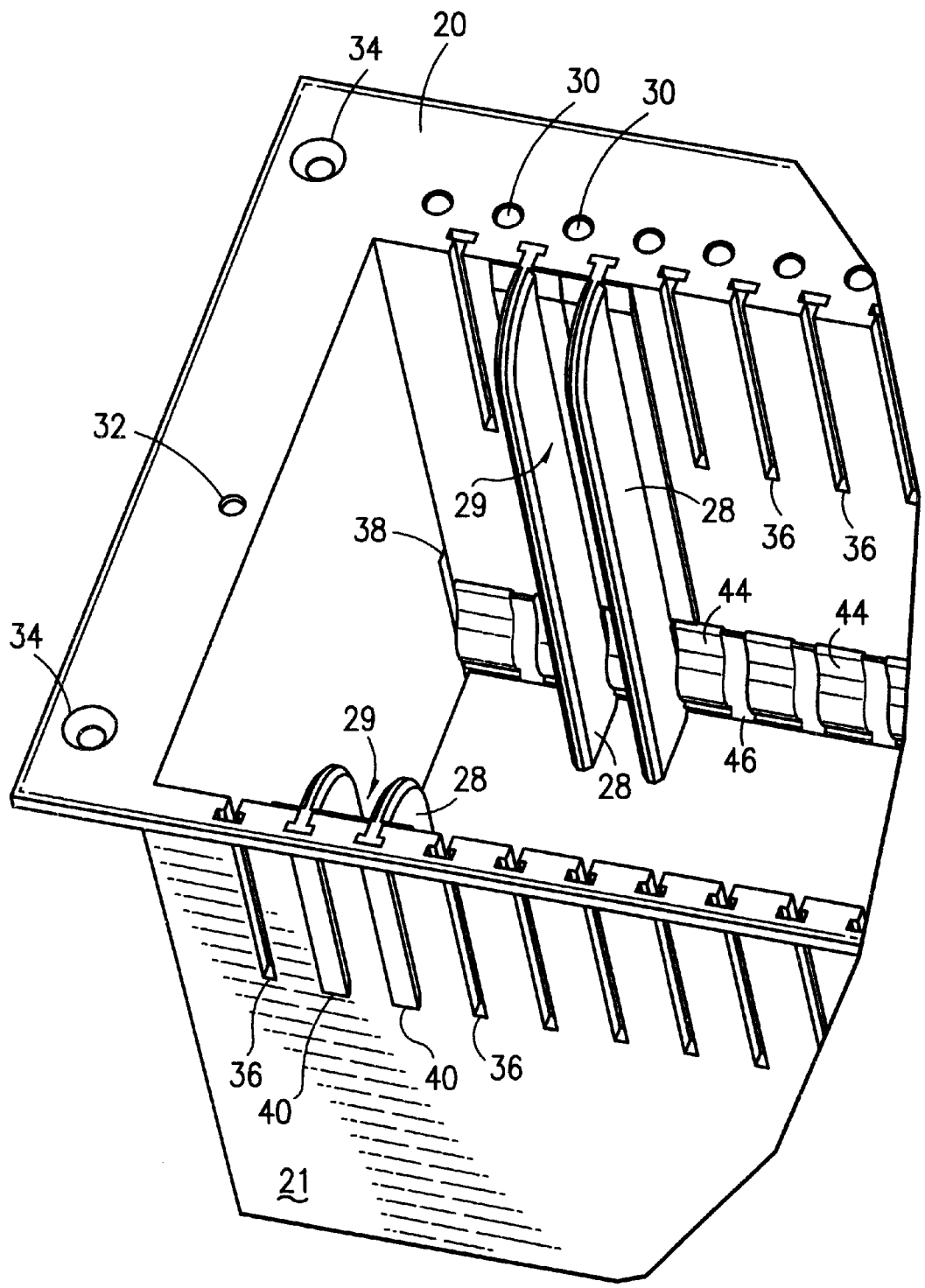
FIG. 11 is a partial perspective view of that of FIG. 3 partially assembled.

Referring to FIG. 11, a portion of framework 21 is illustrated in partial assembly. Rigid member 46 can first be positioned along a lower portion of framework 21 as shown, and an interconnecting cable (not shown) can extend through slot 38. Raised members 40 of separators 28 are then slid into slots 36. Recessed portions 42 of separators 28 secure rigid member 46 in place. Each actuator 44 depresses a corresponding underlying membrane switch 45 each time a CD is inserted into a slot 29 that the particular actuator 44 is disposed within. Thus the central controller 2 can be signalled each time a CD is inserted or removed from slot 29. In the present example, thirty-two (32) switches 45 are preset into each storage module 20, one switch for each slot 29.

Figure 12:
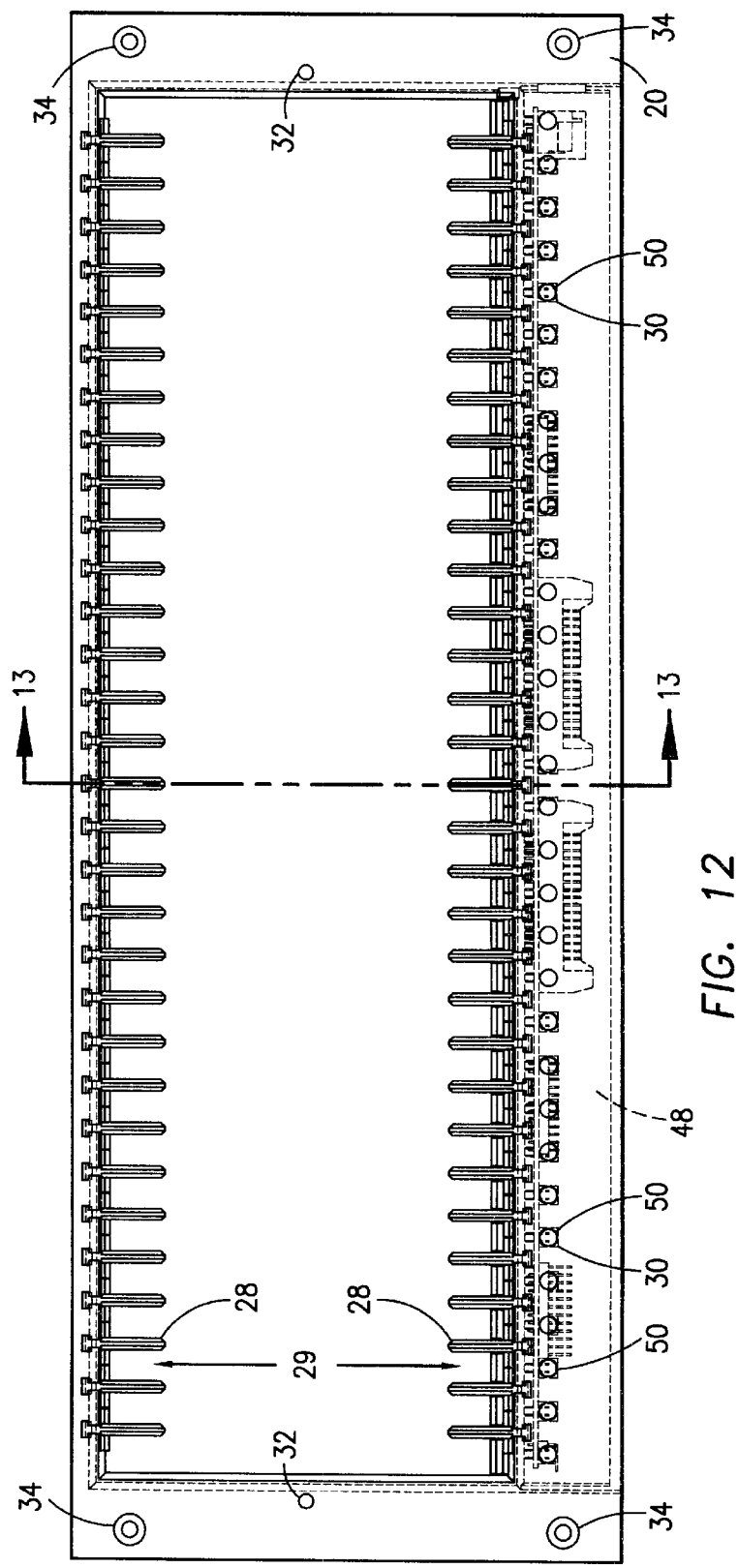
FIG. 12 is a top plan view of that of FIG. 3 with the printed circuit board installed.
Figure 13:
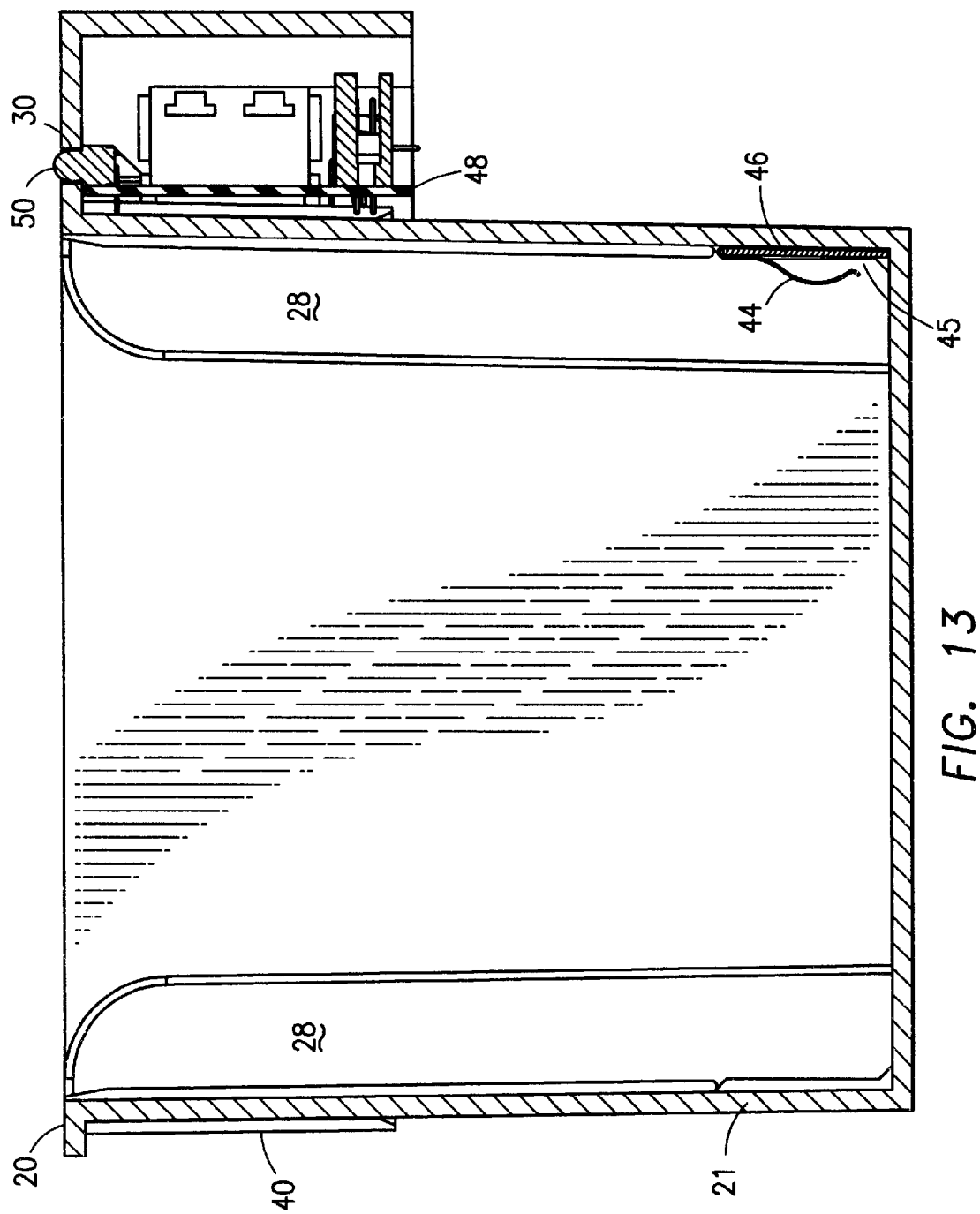
FIG. 13 is a cross-section view taken along line 13—13 of FIG. 12.

Referring to FIGS. 12 and 13, printed circuit board (PCB) 48 is shown with a plurality of LEDs 50 mounted thereon. Each LED 50 extends through an aperture 30 in storage module 20. Apertures 30 and LEDs 50 form the position indicators 14, used to direct the user to a specific storage location.

In one embodiment, PCB 48 can include a microcontroller (not shown), power and communication connectors, and an interface to a secondary PCB which can operate as a slave PCB. In this manner, each drawer 24 can contain a master PCB mounted in one storage module 20 providing communication to the central controller 2, and three slave PCBs mounted in the other three storage modules 20 and communicating with the master PCB for that drawer.

Figure 14:
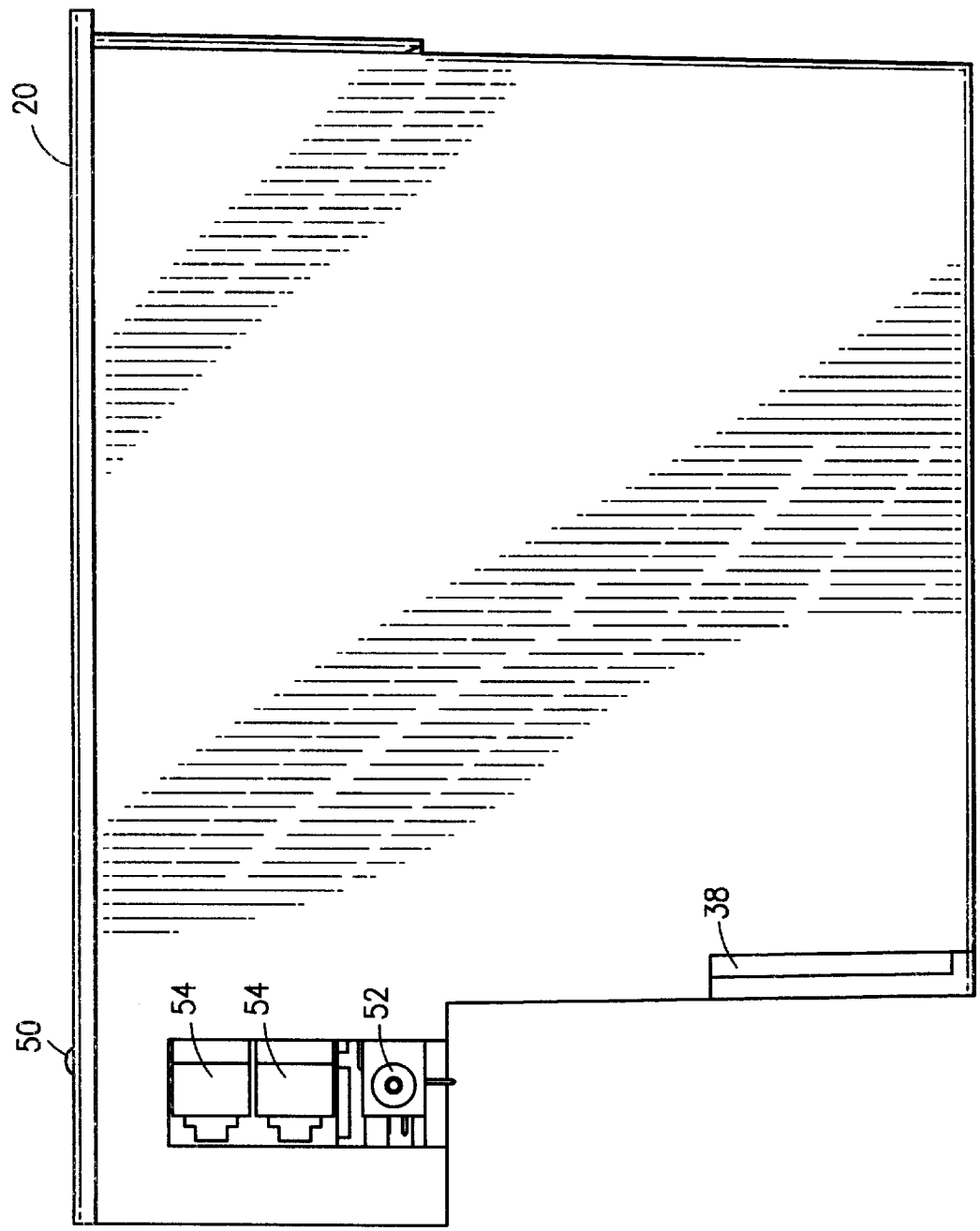
FIG. 14 is a rear elevational view of that of FIG. 12.

Referring to FIG. 14, one embodiment for power connector 52, and two communication connectors 54 for communication with serial network 11 are illustrated. Connectors 54 are preferably conventional RJ11 type telephone connectors.

In operation, the media such as a CD in the present example, can be read or scanned utilizing optical reader 12 prior to entry into a storage location 29. Once scanned, the CD is placed into a storage location 29 causing an actuator 44 to depress a switch 45. Controller 2 receives the switch signal from switch 45 and identifies the particular storage location 29 with the particular CD information scanned. The information is retained within the user database. Additional information can be added to the database beyond that previously scanned.

If the CD has already been entered into the database when the CD is scanned, controller 2 can update the database with the storage location 29 that the user chooses to return the CD, and can display an appropriate message to the user via display 6.

Upon a request for a particular CD via input device 4, controller 2 can illuminate a drawer LED 26 to direct the user to a particular drawer. Controller 2 can illuminate a storage module 20 LED 32, to identify a particular storage module 20 to the user. And, controller 2 can illuminate a storage location LED 50 to identify the particular storage slot 29 which contains the medium desired by the user. The initial request for a particular CD can consist of incomplete or partial information, and the controller can search the database for matching information to locate the desired CD. The controller 2 can display appropriate messages and possible choices on display 6 for confirmation by the user.

In one embodiment, the optical reader 10, such as a bar code reader, can be located in each drawer 24, such that scanning of each medium upon entry into slots 29, can be mostly transparent to the user.

In one embodiment, some or all of the CD storage locations can be CD "holding cells". The holding cells can be used for CDs which have been selected but not yet played, such that the user can select numerous CDs and move them to the holding cells so that several CDs can be used without going through the selection process again. The holding cells can also be used to hold empty jewel boxes for CDs in a multiple disc player. If the user removes a CD from a storage cell, inserts the CD in a player, and places the jewel box in a storage cell without moving any other CDs in between, then it would not be necessary to scan the CD before returning it to a storage cell. As long as more than one jewel box is not out of a storage cell at one time, the optical scanner will only be needed for entering new CDs. This saves time and makes feasible a lower cost system that uses only the keyboard for new data input and does not require a scanner.

Figure 15:
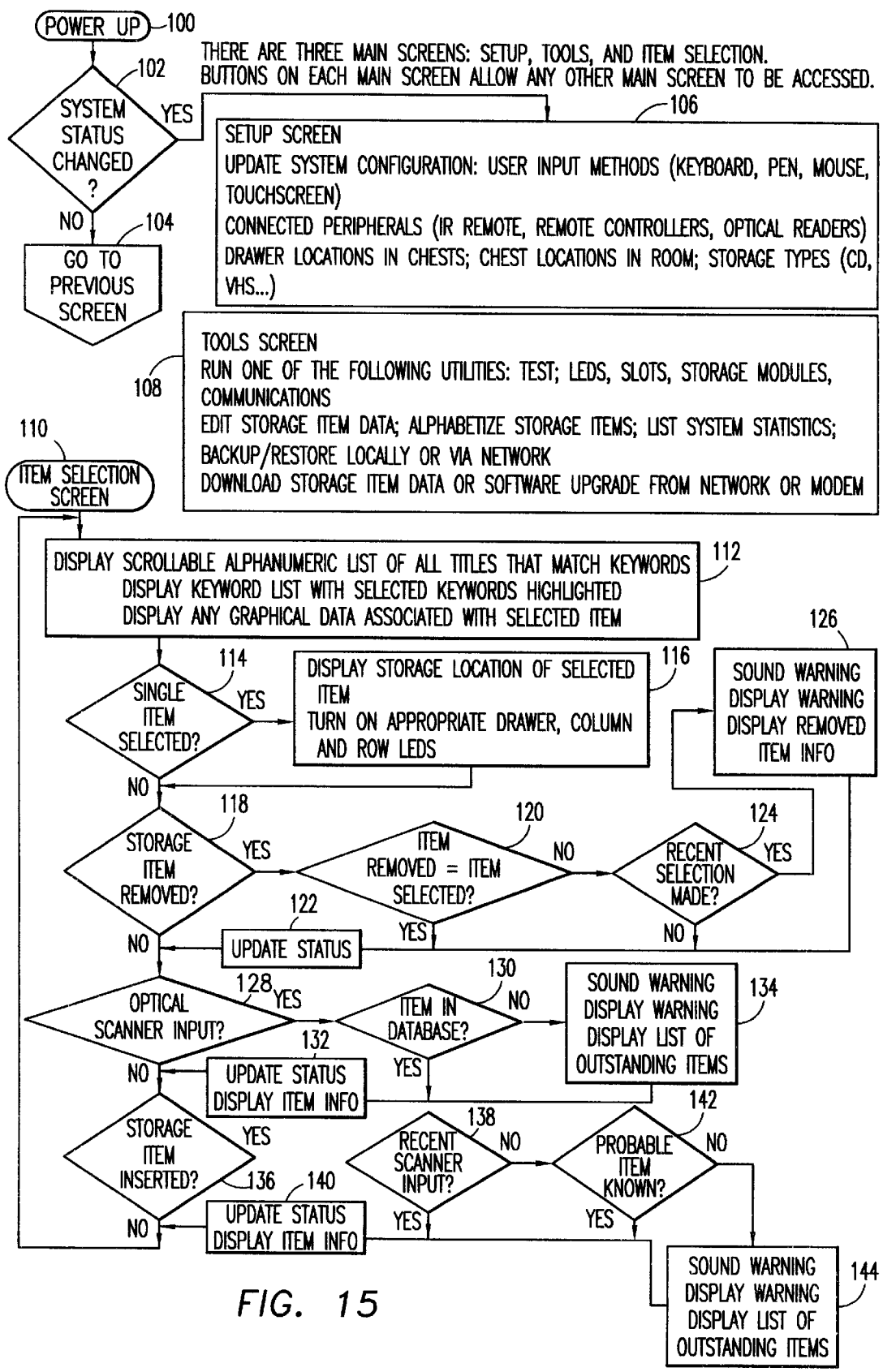
FIG. 15 is a flowchart of one embodiment of user interface software for the present invention.

Referring to FIG. 15, a flow diagram of one embodiment of a custom software module for the present invention is illustrated. The module is flexible and can be utilized for the CD example described herein above, or other embodiments for other storage media. The following is a description of the flow diagram of FIG. 15.

The system is initially powered up 100, and if the system status has not changed 102 the previous screen used 104 is displayed, such as on display 6 as shown in FIG. 1. There are three main screens, setup 106, tools 108, and selection 110. Each of the three main screens are easily accessible from any of the main screens.

If the system status has changed 102, the setup screen is displayed 106. The setup screen 106 allows the system configuration to be updated and includes selection of the user input methods such as keyboard, pen, mouse, touchscreen, or a combination. The connected peripherals are identified, such as IR remote 15, remote controllers 13, optical readers 10, and the like. Drawer 24 locations are polled and identified, cabinet or chest locations in specific rooms are identified, and storage media types are identified such as CDs, VHS tapes, cassettes, and the like.

The tools screen 108 allow various utility programs to be run. For example, a test program can check the status of the system position sensors 12, position indicators 14, (including LEDs 50, 32, and 26), communications, and other subsystems. Storage media data in the database can be edited. Storage media can be alphabetized. Statistics such as specific usages can be displayed. Local and remote via network 9 backups and restores can be performed. Data can be downloaded, and software can be upgraded via the network 9 or modem 7.

Item selection screen 110 displays various messages 112 in response to user inputs. For example, a scrollable list of all titles that match keywords, a keyword list with selected keywords highlighted, and any graphical data associated with a selected media item.

If a single item is selected 114, the storage location of the selected items is displayed 116, and the appropriate drawer 24, storage module 20, and storage slot 29, LED is illuminated, (26, 32, and 50, respectively). If a single item was not selected then continue.

If the storage item is removed 118, and the item removed is the item selected 120, then update the status 122 and continue. If not, and if a recent selection 124 was made, sound and display a warning and the removed item 126, update the status 122, and continue. If a recent selection was not made, update the status 122 and continue. If a storage item was not removed 118 then continue.

If the optical scanner is activated 128 and the item is in the database 130, update the status and display the selected item information 132 and continue. If the item is not in the database 130, sound and display a warning, go the "edit storage item" subscreen (see tools screen 108), and update the status and display item information 132 and continue. If there is no scanner input 128 then continue.

If a storage item is inserted 136, and there was a recent scanner input 138, then update the status and display the item information 140 and continue. If there was no recent scanner input 138, and if the item is known 142, update the status and display the item information 140 and continue. If the item is not known 142, then sound and display a warning and display a list of outstanding items 144, update the status and display the item information 140 and continue to the item selection display 112.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A selection, storage, and retrieval system requiring an operator to manually store and receive a plurality of electronic information storage media, including cassettes, tapes, compact discs, and CD-Roms each housed in a storage container containing pre-displayed indicia for optical reading comprising:

a controller capable of receiving input and output information from said operator including means for displaying output, said means for displaying output including an operator-visual presentation that provides relevant information for each electronic information storage media to said operator that is stored;

a non-volatile memory for storage of an operator interface computer program for use with said controller;

manual input means for access to said controller;

a plurality of storage modules connected to said controller including:

means for storing each of said plurality of electronic information storage media, means for indicating a particular storage location of said means for storing in response to the operator request from said manual input means;

means for sensing the insertion and removal of each of said plurality of storage media;

at least one optical reader connected to said controller for gathering information related to each of said plurality of electronic information storage media;

said plurality of storage modules and said at least one optical reader are connected to said controller by a serial communications network; and a database stored in said non-volatile memory, said database responsive to said operator interface computer program for storing content information about each of said plurality of electronic information storage media and correlating said content information with each of said particular storage locations;

said operator-visual presentation available to said operator including a set-up screen, an item-selection screen, and a tool screen, said item-selection screen including a display scrollable alphanumeric list of all titles that match key words, a display key word list with selected key words highlighted, and a display of graphical data associated with the electronic information storage media selected whereby the operator can select a particular electronic information storage medium to be retrieved using partial information and inputting the partial information to said controller for selection and retrieval of the particular electronic information storage media item.

2. A selection, storage, and retrieval system for a plurality of electronic information storage including media, compact discs, cassette tapes, and CD-Roms, packaged in individual packages which include indicia for sensor recognition for storage and retrieval by an operator comprising:

a controller including means for displaying output to the operator to provide data and information relative to a particular information storage medium in storage, a non-volatile memory for storage of an operator interface computer program and database, and means for the operator to input data relative to a particular one of said information storage media;

at least one optical reader connected to said controller;

at least one storage module connected to said controller, including:

a plurality of storage compartments for the plurality of electronic information storage media, a plurality of operator-observable LEDs, one each of said LEDs for indicating each of said plurality of storage compartments in response to the operator request from said means for input; and a plurality of switches, of said switches each one for sensing the operator insertion and removal of a respective one of said plurality of electronic information storage media.

3. The system as in claim 2, wherein:

said displaying ouput means includes an operator-observable set-up screen including operator input methods;

an operator-observable tool screen that includes alphabetized storage items, list system statistics and item screen selection including display scrollable alphanumeric lists of all titles that match key words, display key word lists with selected key words highlighted, and display graphical data associated with a selected information storage medium whereby said set-up screen, said tool screen, and said item screen are all observable to the operator of the system, said system including a keyboard for operator input, for operator access of a selected one of said electronic information storage electronic media from said system with the operator inputting a limited amount of data through said keyboard.

* * * * *